(12) United States Patent
Derushia et al.

(10) Patent No.: US 10,488,646 B2
(45) Date of Patent: Nov. 26, 2019

(54) REALTIME AIMING ZEROING RECONNAISSANCE SIGHT

(71) Applicant: BAE Systems Information & Electronic Systems Integration Inc., Nashua, NH (US)

(72) Inventors: Scott A Derushia, Amherst, NH (US); Michael J Choiniere, Merrimack, NH (US); John H Koltookian, Medford, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/075,191

(22) PCT Filed: Apr. 25, 2016

(86) PCT No.: PCT/US2016/029158
§ 371 (c)(1),
(2) Date: Aug. 3, 2018

(87) PCT Pub. No.: WO2017/188923
PCT Pub. Date: Nov. 2, 2017

(65) Prior Publication Data
US 2019/0041626 A1    Feb. 7, 2019

(51) Int. Cl.
*G02B 23/00*      (2006.01)
*F41G 1/14*       (2006.01)
(Continued)

(52) U.S. Cl.
CPC ............. *G02B 23/145* (2013.01); *F41G 1/14* (2013.01); *G02B 23/105* (2013.01); *G03H 1/22* (2013.01); *G03H 2001/2284* (2013.01)

(58) Field of Classification Search
CPC ..... F41G 1/30; F41G 1/38; F41G 1/00; F41G 1/14; G02B 23/14; G02B 27/36; G02B 23/10; G02B 23/105; G02B 5/32
See application file for complete search history.

(56) References Cited

U.S. PATENT DOCUMENTS 5,349,179 A      9/1994  Morley
5,531,040 A  *   7/1996  Moore .................... F41G 1/35
                                                362/114

(Continued)

OTHER PUBLICATIONS

International Search Report, PCT/US2016/029158, 9 pages, dated Jan. 17, 2017.

*Primary Examiner* — Christopher Stanford
(74) *Attorney, Agent, or Firm* — Maine Cernota & Rardin; Scott J. Asmus

(57) ABSTRACT

A holographic, single-unit, augmented sight has a housing containing a see-through holographic eyepiece; at least one of a visible light digital camera and an LWIR digital camera; a display to display an image from the camera(s); a shutter presenting the display; a red dot fiber-coupled LED reticle assembly using a spherical ball configuration sandwiched between two matching seats which are compressed together to contain the spherical ball configuration optical position; and a lever attached to the spherical ball configuration to rotate the ball by moving the lever up/down, left/right to adjust windage and elevation; a lower coupling prism presenting the reticle of the reticle assembly.

15 Claims, 12 Drawing Sheets

(51) Int. Cl.
*G02B 23/10* (2006.01)
*G03H 1/22* (2006.01)

(56) References Cited

U.S. PATENT DOCUMENTS

| | | | |
|---|---|---|---|
| 6,237,462 B1* | 5/2001 | Hawkes | F41A 23/12 |
| | | | 89/37.05 |
| 6,490,060 B1 | 12/2002 | Tai et al. | |
| 6,724,991 B1 | 4/2004 | Chase | |
| 9,389,045 B2* | 7/2016 | Reichert | F41G 1/30 |
| 9,494,787 B1* | 11/2016 | Bagwell | G02B 23/145 |
| 9,651,786 B1* | 5/2017 | Browne | G02B 27/0172 |
| 2002/0030163 A1 | 3/2002 | Zhang | |
| 2004/0047586 A1 | 3/2004 | Schick et al. | |
| 2006/0077279 A1 | 4/2006 | Kang | |
| 2006/0133798 A1 | 6/2006 | Palmer | |
| 2007/0137090 A1 | 6/2007 | Conescu | |
| 2009/0100735 A1* | 4/2009 | Schick | F41G 1/345 |
| | | | 42/123 |
| 2011/0067288 A1* | 3/2011 | Hakansson | F41G 1/38 |
| | | | 42/119 |
| 2012/0000979 A1* | 1/2012 | Horvath | F41G 1/38 |
| | | | 235/407 |
| 2012/0030985 A1* | 2/2012 | Mauricio | F41G 1/38 |
| | | | 42/84 |
| 2012/0033195 A1* | 2/2012 | Tai | F41G 1/38 |
| | | | 356/4.01 |
| 2012/0106170 A1* | 5/2012 | Matthews | F41G 1/30 |
| | | | 362/311.06 |
| 2012/0200793 A1 | 8/2012 | Tehrani | |
| 2012/0262615 A1* | 10/2012 | Gaber | H04N 5/2251 |
| | | | 348/311 |
| 2014/0123532 A1* | 5/2014 | Russ | F41G 1/38 |
| | | | 42/113 |
| 2015/0267998 A1 | 9/2015 | Grace, Jr. et al. | |
| 2016/0327365 A1* | 11/2016 | Collin | F41G 1/30 |

\* cited by examiner

300

305

310

315

320

400

405

410

800

805

1200

|      | 640   |        |        | 1235   |        |        |
|------|-------|--------|--------|--------|--------|--------|
|      | 30    | 40     | 50     | 60     | 70     | 80     |
| 1230 | 0.820 | 1.094  | 1.367  | 1.641  | 1.914  | 2.188  |
| 1225 |       |        | 1220   |        |        |        |
| 10   | 0.820 | 1.094  | 1.367  | 1.641  | 1.914  | 2.188  |
| 20   | 1.641 | 2.188  | 2.734  | 3.281  | 3.828  | 4.375  |
| 35   | 2.871 | 3.828  | 4.785  | 5.742  | 6.699  | 7.656  |
| 50   | 4.102 | 5.469  | 6.836  | 8.203  | 9.570  | 10.938 |
| 100  | 8.203 | 10.938 | 13.672 | 16.406 | 19.141 | 21.875 |
| 200  | 16.406| 21.875 | 27.344 | 32.813 | 38.281 | 43.750 |

|      |       |       | 1250  |       |       |       |
|------|-------|-------|-------|-------|-------|-------|
|      | 30    | 40    | 50    | 60    | 70    | 80    |
|      | 0.820 | 1.094 | 1.367 | 1.641 | 1.914 | 2.188 |
|      |       |       | 1255  |       |       |       |
| 1240 | 14.63 | 10.97 | 8.78  | 7.31  | 6.27  | 5.49  |
| 1245 | 1.22  | 0.91  | 0.73  | 0.61  | 0.52  | 0.46  |

FIG. 12

REALTIME AIMING ZEROING RECONNAISSANCE SIGHT

FIELD OF THE DISCLOSURE

Embodiments relate to a holographic, single-unit, augmented sight.

BACKGROUND

The Advanced Combat Optical Gunsight (ACOG) is typically a 1× or 4× fixed optical sight with no zoom capability. It provides an aim point and does not allow any higher level optical features. Existing solutions tend to use an optical zoom which adds weight to the ACOG.

The day operation conventional approach is to utilize an optical sight with direct view optics and a red dot aim point. Due to weight/size/cost restrictions the optical sight is typically fixed magnification; 1× or 4× magnification being the standard. Adding optical zoom is typically weight, cost, and size prohibited on a standard infantry weapon.

Day/night weapon sights with zoom capability have multiple problems. The day operation conventional approach is to utilize an optical sight with direct view optics and a red dot aim point. Due to weight/size/cost restrictions, the optical sight is typically fixed magnification; 1× or 4× magnification again being the standard. At night, the weapon sight would be supplemented with a thermal "clip-on" mount in front of the optical sight to provide a night capability; however, this adds additional hardware that needs to be carried by the warfighter, increases complexity, and reduces reliability.

A need exists for a rugged, reliable, light weight, cost-effective, single-unit sight supporting varied environments.

SUMMARY

An example embodiment of the present disclosure provides a holographic, single-unit, augmented sight device comprising a single housing containing a see-through holographic eyepiece (425); at least one digital camera (415); a display (420) to display an image from the camera; a shutter (510, 710) presenting the display; a red dot fiber-coupled LED reticle assembly (600); and a lower coupling prism (545) presenting reticle of the reticle assembly. Particular implementations may include one or more of the following features. In embodiments, at least one digital camera comprises a visible wavelength digital color camera (535). In other embodiments, at least one digital camera comprises a LWIR digital camera (1105). In subsequent embodiments, at least one digital camera comprises a visible wavelength digital color camera (535) and a LWIR digital camera (1105). For additional embodiments the display is an OLED/LCD display (715). In another embodiment, the shutter is an electro-optical shutter (710). For a following embodiment, the red dot fiber-coupled (610) LED (615) reticle assembly comprises a spherical ball configuration (515, 630); the spherical ball configuration (515, 630) sandwiched between two matching seats (635), the seats compressed together to contain the ball configuration optical position; a lever (520, 625) attached to the spherical ball configuration, the lever providing a means to rotate the ball by moving the lever up/down, left/right thereby providing a slight translation necessary to adjust windage and elevation, whereby only minor translation is needed for red dot adjustment. In subsequent embodiments, the red dot fiber-coupled LED reticle assembly (600) comprises two compression plates (635); a collimator; optics; and two drive screws for lever adjustment; whereby two sliding translation stages move the collimator position up/down or left/right, and a part count is significantly reduced, reducing cost and increasing reliability of aim point position. In additional embodiments, the red dot fiber-coupled LED reticle assembly (600) comprises about a 0.66 degree flex angle; about a 0.0115 inch translation range; and about 0.14 mil steps. In included embodiments, the device comprises molded glass optics. In yet further embodiments the imaging comprises about a 4 power native image true eZoom; a field of view of about 20 degrees, an IFOV of about 65µ radians; a pixel size of about 1.1 µm; Fl of about 17.2 mm; and a format size of about 7.4 mm by about 5.6 mm. In related embodiments the device includes only one prism. For further embodiments, the device is a Realtime Aiming Zeroing Reconnaissance system. In ensuing embodiments, the device is a pocket scope/viewer.

Another example embodiment provides a method for using a holographic, single-unit, augmented sight device comprising providing a single housing (400) containing a see-through holographic eyepiece (425); at least one digital camera (415); a display (420) to display an image from the camera; a shutter (510, 710) presenting the display; a red dot fiber-coupled LED reticle assembly (600); a lower coupling prism (525) presenting reticle of the reticle assembly; and aiming, through the holographic, single-unit, augmented sight at a target in at least one of visible and LWIR wavelengths. Particular implementations may include one or more of the following features. For yet further embodiments, at least one digital camera comprises about a 40 degree field of view at about a 1 power zoom; about a 20 degree field of view at about a 2 power zoom; about a 10 degree field of view at about a 4 power zoom; and about a 5 degree field of view at about an 8 power zoom, wherein the about 5 degree, about 8 power zoom is full native resolution. For more embodiments, at least one digital camera comprises a visible wavelength digital color camera (535) and a LWIR digital camera (1105), and the aiming includes both color visible and LWIR wavelengths. Continued embodiments include windage and elevation adjustment accomplished by rotating a spherical ball (515, 630) of the red dot fiber-coupled LED reticle assembly by moving a lever up/down, left/right. For additional embodiments, a cover (440) is flipped down to sight optics that serves to turn on a visible camera subsystem and block light coming into the sight, allowing clear viewing of the display which provides a magnified scene to a user.

Another example embodiment of the present invention provides a holographic, single-unit, augmented sight system comprising a single housing (400) containing a see-through holographic eyepiece (425); a visible wavelength digital camera (415); an LWIR wavelength digital camera (1105); a display to display an image from the cameras (420); an LCD shutter presenting the display (510, 710); a red dot fiber-coupled LED reticle assembly (600) comprising a spherical ball configuration (515, 630); the spherical ball configuration sandwiched between two matching compression plate seats (635), the seats compressed together to contain the ball configuration optical position; a collimator; optics; and two drive screws; a lever (520, 625) attached to the spherical ball configuration, the lever providing a means to rotate the ball by moving the lever up/down, left/right thereby providing a slight translation necessary to adjust windage and elevation, whereby only minor translation is needed for red dot adjustment and a part count is significantly reduced, reducing cost and increasing reliability of aim point position; and a lower coupling prism (545) presenting reticle of the reticle assembly; the sight providing about a 40 degree field of view at about a 1 power zoom; about a 20 degree field of view at about a 2 power zoom; about a 10 degree field of view at about a 4 power zoom; and about a 5 degree field of view at about an 8 power zoom.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

FIG. 12 depicts a table of electro-optical shutter specifications configured in accordance with an embodiment.

Figure 1:
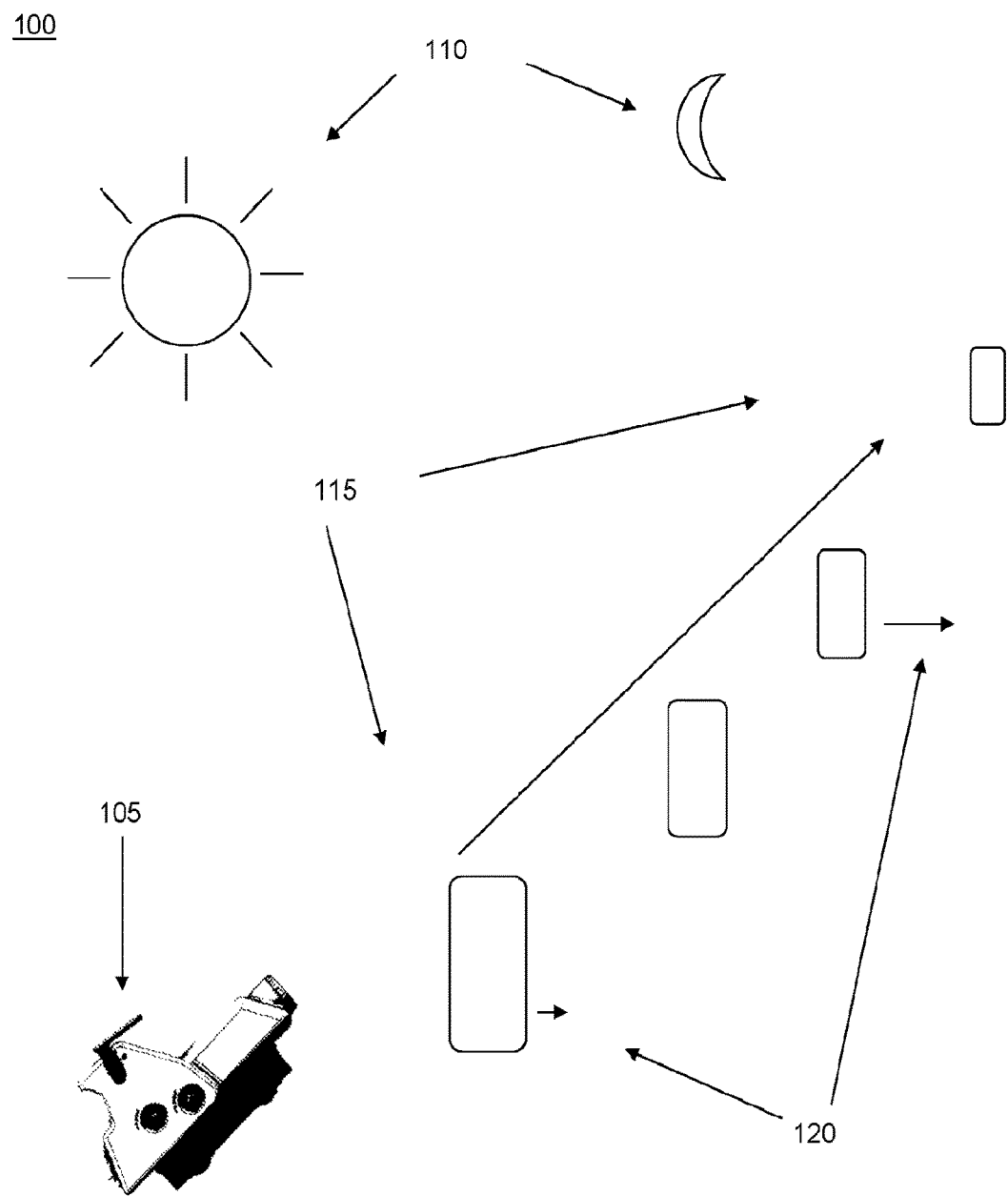
FIG. 1 is a depiction of environment applications configured in accordance with an embodiment of the invention.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

Embodiments add less than 0.2 lbs. and low cost in production. This allows every Realtime Aiming Zeroing Reconnaissance sight to be a digital monocular with target ID ranges up to 3 Km. This also supports embodiments relating to hunting, and a further embodiment employs the system for target practice.

A solution to the aforementioned problems is to couple a small, low power, cell camera within the Realtime Aiming Zeroing Reconnaissance sight optics. An optical shutter cuts out the scene from the Realtime Aiming Zeroing Reconnaissance sight when the camera is activated. The day camera feasibly provides extended viewing range with relatively little to no volume impact to holographic sights Embodiments provide a rifle scope with a red dot with unit magnification and embed 2, 4, and 8× magnification with the insertion of a digital camera. This approach could be for a rifle scope, pocket scope/viewer or any device where higher magnification is needed to view scene.

By inserting a high resolution visible camera into the sight, the operator is provided with an eZoom capability which is typically offered only by high powered sniper weapon sights. In embodiments, a red dot aim point is generated by a fiber coupled LED into a small collimator/reticle configuration that is projected into a beam splitter into the eyepiece. This provides the shooter with the same basic functionality as the standard weapon sight, including a 1× a magnification at a 40 degree FOV. Embodiments couple in a high resolution visible camera to provide 2×, 4×, and 8× magnification. In use, the shooter flips down a cover to the sight optics that serves 2 functions: 1) it turns on the visible camera subsystem, and 2) it blocks the light coming into the weapon sight and allows clear viewing of the display which provides the magnified scene to the shooter. The advantages of this approach are that this compact weapon sight supports up to 8× magnification that would typically weigh 4× more due to the large set of optics. A benefit to the warfighter is that every standard weapon sight now has sniper scope capability without the weight, size, and cost penalty.

Embodiments also comprise a thermal Long Wave Infra-Red (LWIR) camera in replacement of the visible camera or in addition to the visible camera providing a "built-in" night capability. Digital cameras are small enough to add and supplement the standard weapon sight with small impact to weight.

Embodiments combine a weapon sight featuring a red dot aim point with a digital LWIR and/or visible camera. By inserting a high resolution visible camera into the sight, the operator is provided with an eZoom capability, as mentioned, which is typically offered only by high powered sniper weapon sights. The red dot aim point is generated by a fiber coupled LED into a small collimator/reticle configuration that is projected into a beam splitter into the eyepiece.

FIG. 1 depicts environment applications 100. These comprise sight 105 in day and night use 110; close and distant targets 115; and slow and fast targets 120.

Figure 2:
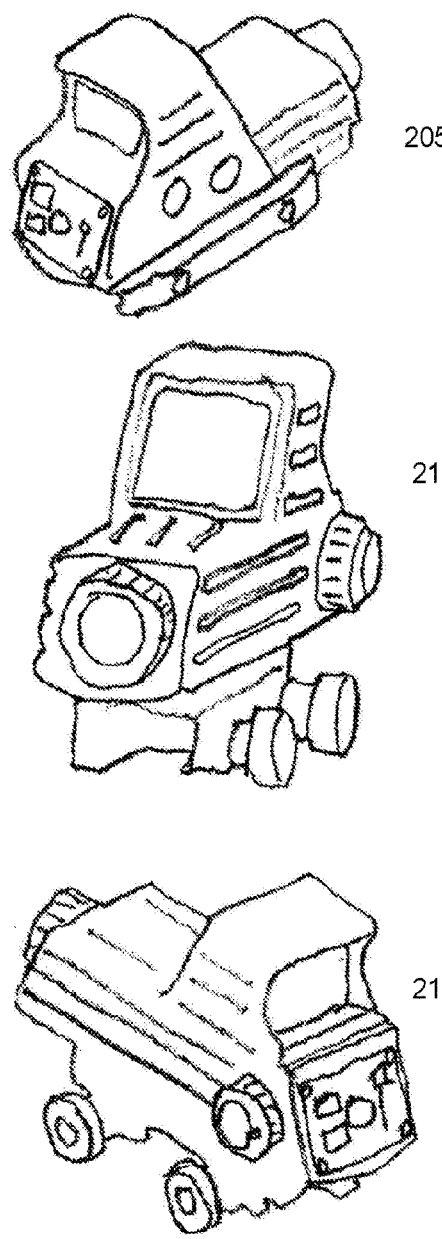
FIG. 2 is a depiction of perspective views configured in accordance with an embodiment.
Figure 2:
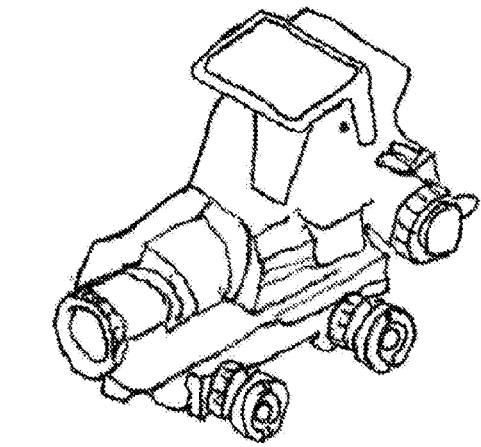

FIG. 2 depicts perspective embodiment views 200. Perspective views are rear quarter 205; front quarter 210; opposite rear quarter 215; front quarter alternate embodiment 220; and internal view front quarter alternate embodiment 225. Views 205, 210, and 215 are embodiments of a See-Through Color Display (SCD). Embodiments of the SCD look and feel like current Enhanced Combat Optical Sight (ECOS) products, but provide significantly more capability. Embodiments leverage cell phone cameras to augment the 1× holographic operation with digital capability at high resolution up to 8×. Embodiments enable Close Quarter Battle (CQB) performance on par with current solutions, while adding extended range capability and maintaining competitive size and weight. Embodiment specifications comprise standard 40° FOV, red dot holographic aimpoint; standard elevation and windage adjustments; full color 21 M-pixel digital camera supporting: 20°, 2× zoom; 10°, 4× zoom; 5°, 8× zoom (full native resolution); digital sensor boresight; and weight commensurate with current ECOS products. This supports remote viewing, image capture, and augmented reality.

Figure 3:
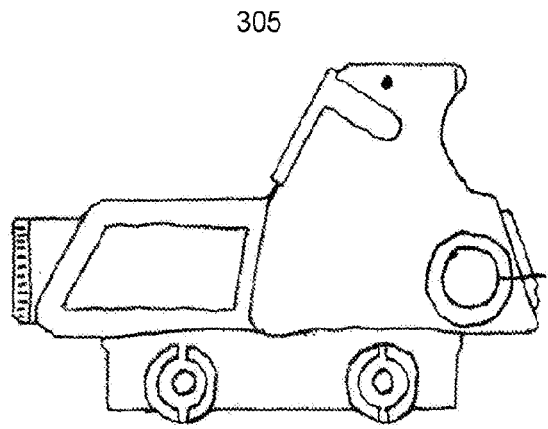
FIG. 3 is a depiction of orthogonal views configured in accordance with an embodiment.
Figure 3:
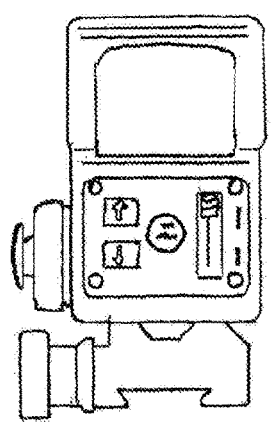
Figure 3:
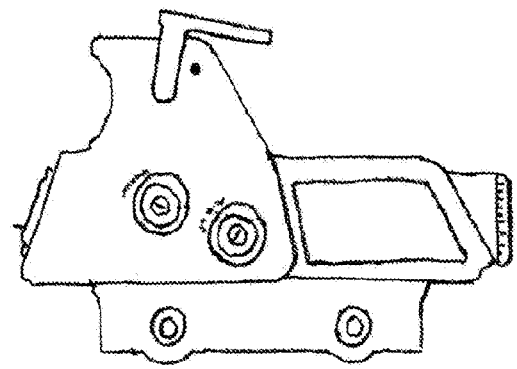
Figure 3:
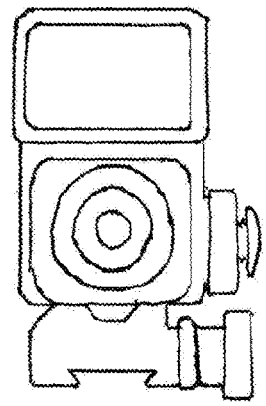

FIG. 3 depicts embodiment orthogonal views 300 of an SCD embodiment. Views are left side 305; rear 310; right side 315; and back 320.

Figure 4:
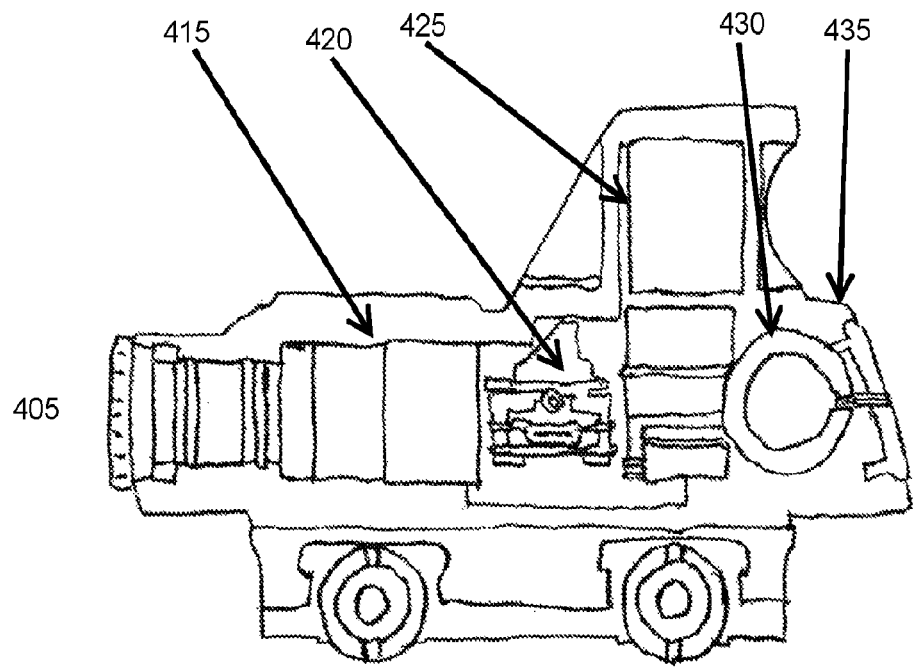
FIG. 4 illustrates sectional views configured in accordance with an embodiment.
Figure 4:
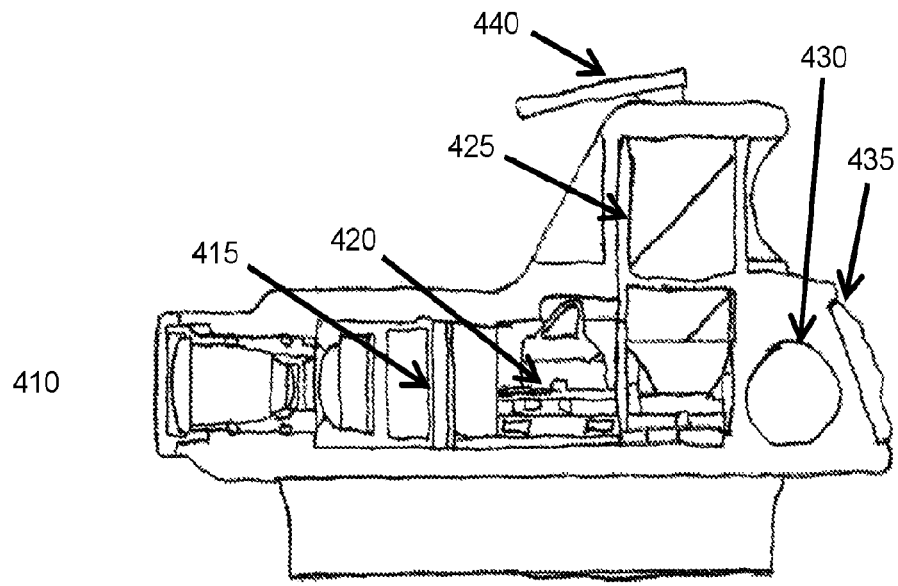

FIG. 4 illustrates embodiment sectional views 400. Embodiments 405 and 410 are shown. Components comprise day camera 415; full color display 420; see-through holographic 425; CR123 battery 430; controls 435, and cover 440. A user flips down cover 440 to sight optics. In embodiments, it also serves to turn on a visible camera subsystem and block light coming into the sight, allowing clear viewing of the display which provides a magnified scene to the user.

Figure 5:
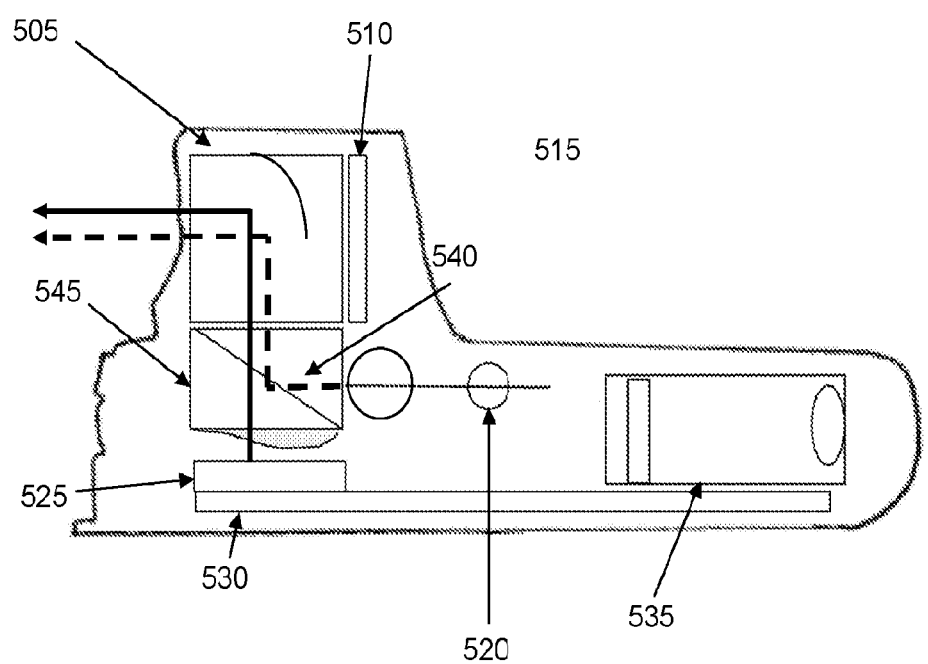
FIG. 5 illustrates a component sectional view configured in accordance with an embodiment.

FIG. 5 illustrates an embodiment component sectional view 500. Identified components are eyepiece 505; LCD shutter 510; red dot fiber coupled LED 515; vertical windage adjustment 520; display 525; processing CCS 530, and day camera 535. It is noted is that the front prism is eliminated, and a lower prism 545 is needed to couple in the red dot 540. Embodiments also provide a means to adjust the red dot aim position to correspond to the weapon/round strike point at range. Embodiments eliminate the second prism due to size as look-through/FOV (40 degrees) requires a much larger prism. The day camera is decoupled from the prism set and installed in the front of the sight. The red dot reticle is used to provide 1,000 hours of operation. Employing the display would have yielded less the 24 hours of operation; this would be a significant constraint. As mentioned, red dot windage adjustment is based on rotation rather than translation and provides exceptional reliability for rugged environments, greatly improving reliability. Embodiments include a prismatic head up display prism set.

Figure 6:
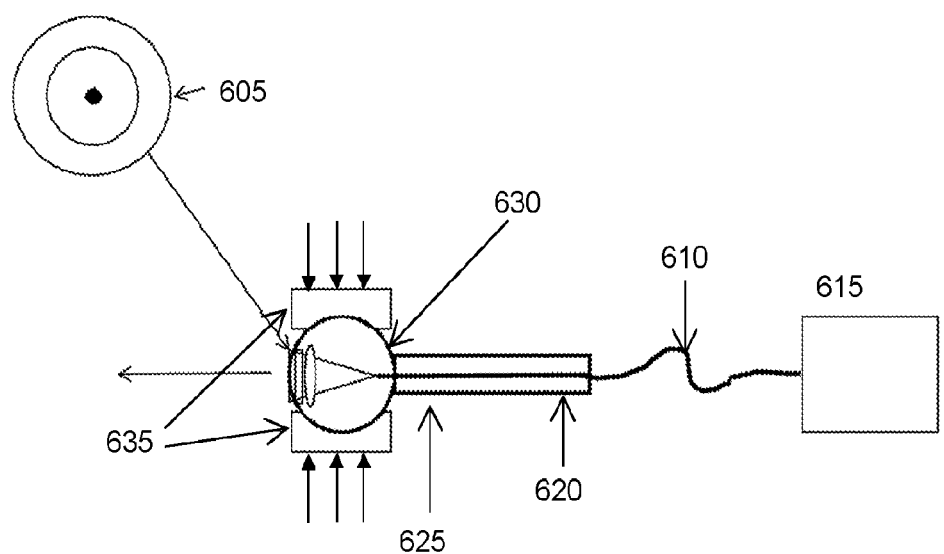
FIG. 6 illustrates reticle components configured in accordance with an embodiment.

FIG. 6 illustrates reticle components 600. Depicted are reticle projection and positioning—any mask and reticle shape 605; optical fiber 610; Red LED 615; elevation adjustment 620; the lever is moved to induce rotation 625. The red dot collimator is shaped in a spherical ball configuration 630 sandwiched between two matching compression plate seats 635 which are compressed together containing the ball/collimator optical position. Since only minor translation is needed for red dot adjustment, a lever is attached to the ball proving the means to rotate the ball by moving the lever up/down, left/right; providing the slight translation necessary for the adjustment. This method provides temperature and shock immunity since the loads are symmetric as compared to two sliding translation stages to move the collimator position up/down or left/right. The part count is reduced to two compression plates, collimator and optics and a couple of drive screws for the lever adjustment; driving down cost while increasing reliability of the aim point position. Red dots typically last >40 days on a single lithium AA battery; however, using the display as a red dot would last only 8 hours—a severe handicap in many applications. The implemented red dot feature does not use the display or processing chain, it maintains a reasonable number of red dot hours before battery swap, and uses mechanical adjusters to align the red dot in the scope.

Figure 7:
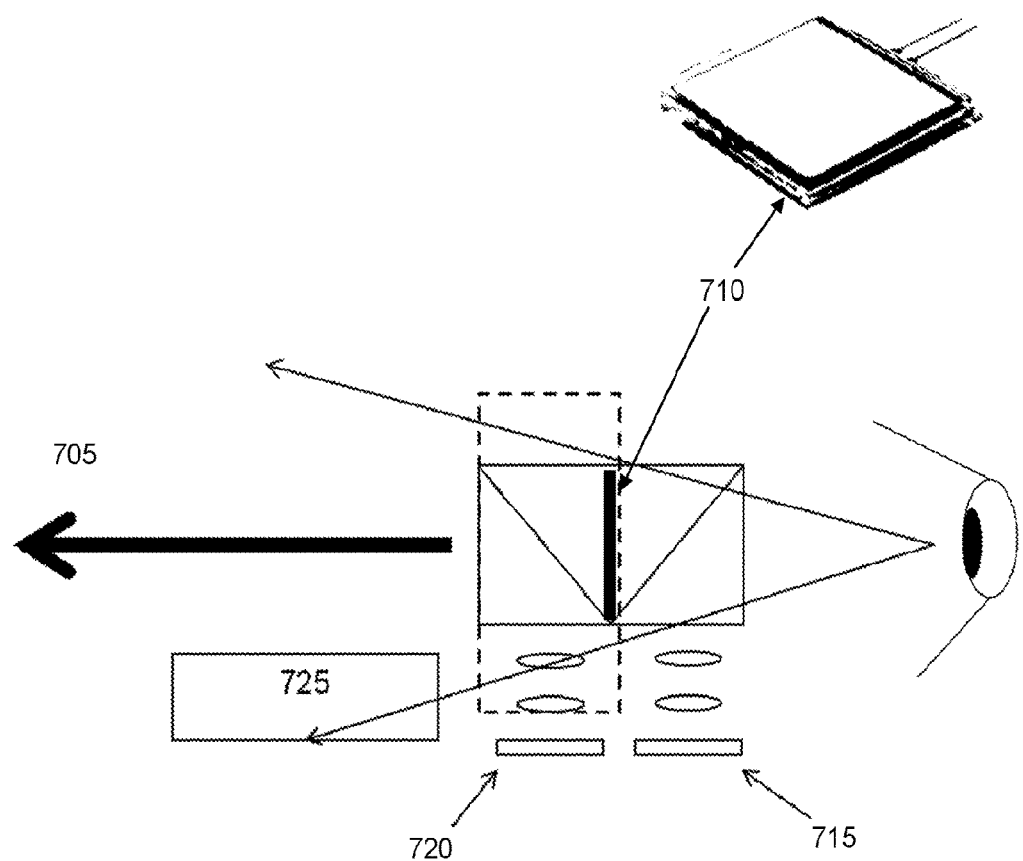
FIG. 7 is a day channel optics diagram configured in accordance with an embodiment.

FIG. 7 is a day channel optics diagram 700. Depicted are direction to target 705; electro-optical shutter 710; display 715; day camera 720; and battery 725. Considering the front prism, there can be size considerations given the FOV (40°) of the 1× scope; embodiments use a prismatic solution of the HMD with the day camera decoupled. For embodiments, a 20 degree 17.5 mrad/degree/4416 pixels configuration results in 80µ radian IFOV; Fl of 17 mm, and F# 2.5 with a 6 mm effective aperture. Embodiments use a 14 M-Pixel Omnivision unit having a 4416 by 3312 pixel array; providing 7× native image true eZoom; designed for 20°, 10°, 5° FOV; coupled with a 1280 display; potentially instead using a commercial OLED/LCD to reduce cost; providing >3 Km ID range; low chip cost; and potentially fabricating the telescope of molded glass for embodiments. Other embodiments use a 21 M-Pixel Omnivision 5344 by 4016 pixel array providing 4× native image true eZoom; FOV of 20 degrees, IFOV of 65µ radians, pixel size 1.1 µm, Fl of 17.2 mm, and a format size of 7.4 by 5.6 mm. Horizontal layout of the camera maintains a low profile.

Figure 8:
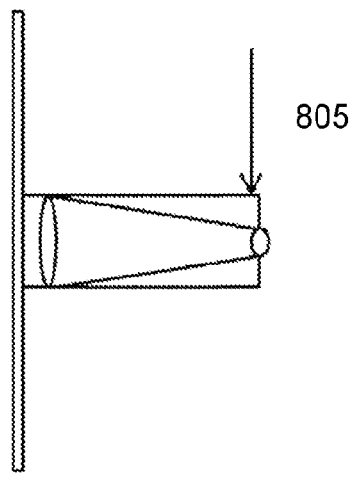
FIG. 8 depicts a flex-red dot structure and layout configured in accordance with an embodiment.
Figure 8:
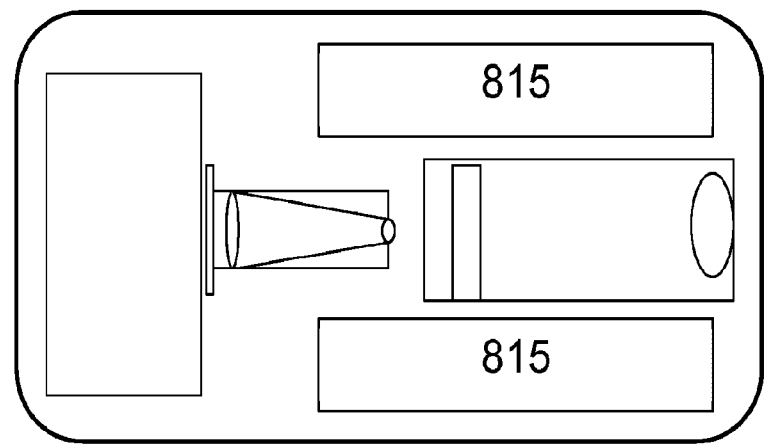

FIG. 8 depicts a flex-red dot structure and layout 800. Shown are red dot structure 805 and layout 810. Embodiments include a 0.66 degree flex angle, a 0.0115 inch translation range, and 0.14 mil steps. L91 battery embodiments 815 are also shown.

Figure 9:
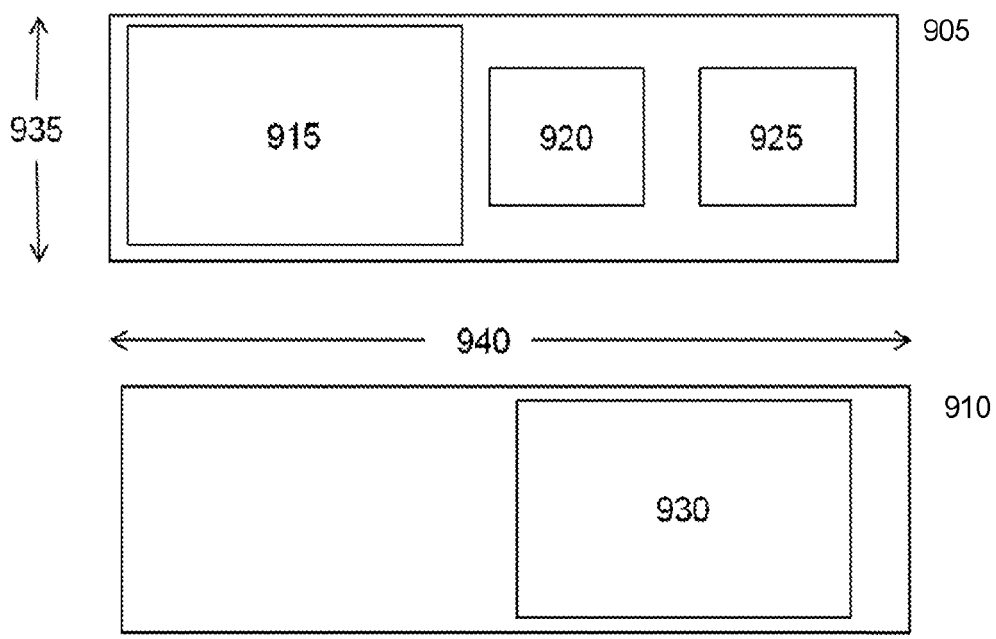
FIG. 9 depicts camera, processing, display single CCA configuration configured in accordance with an embodiment.

FIG. 9 depicts camera, processing, display single CCA configuration 900. Shown are top view 905; bottom view 910; battery management 915; camera 920; display 925; and processing 930. Embodiment dimensions are about 1.5 inches 935 and about 4.0 inches 940.

Figure 10:
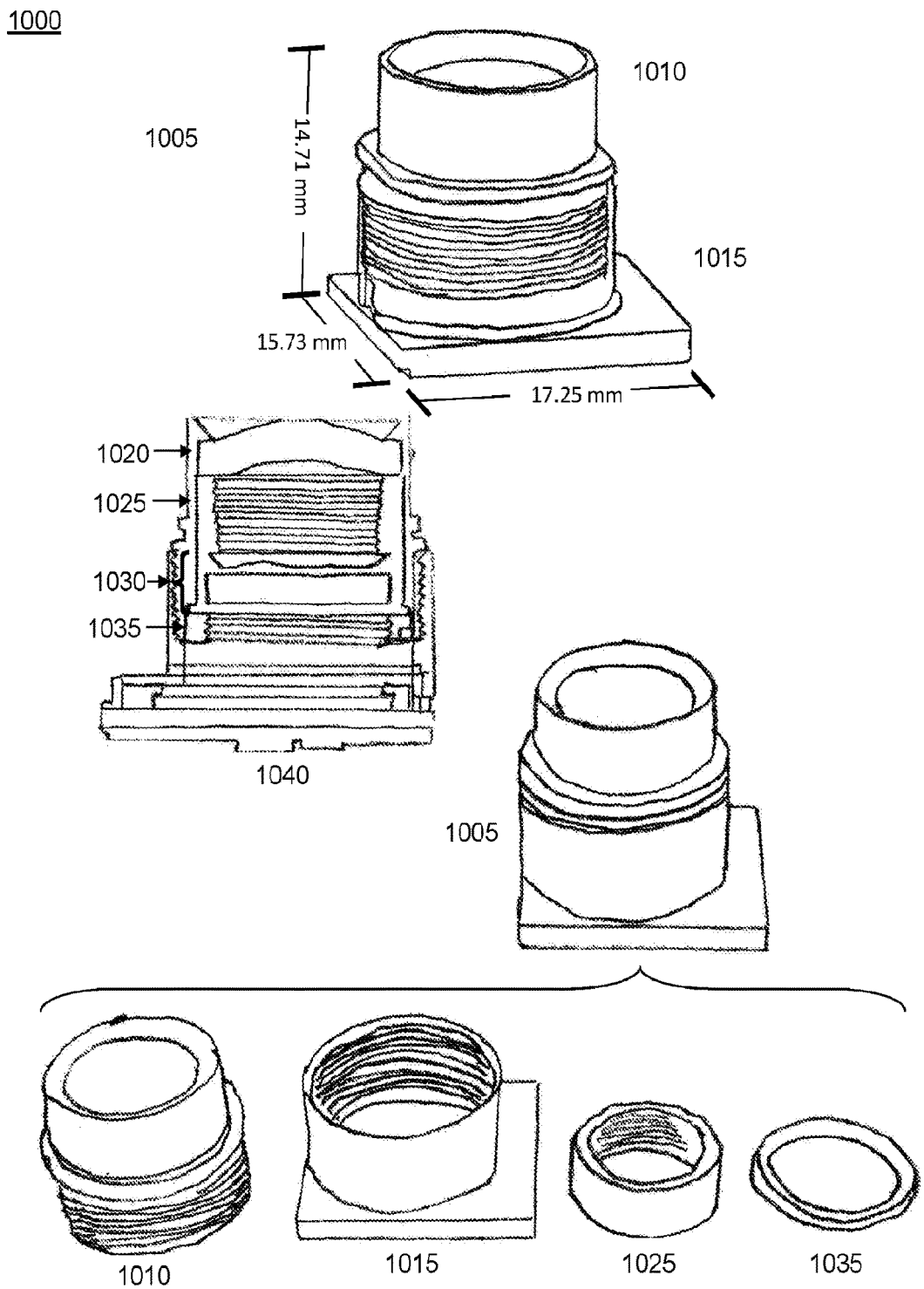
FIG. 10 depicts an LWIR lens assembly configured in accordance with an embodiment.

FIG. 10 is an LWIR lens assembly 1000. Shown are lens assembly 1005 comprising about 3.70 g lens barrel 1010; about 1.11 g lens housing 1015; GASIR lens 1020; spacer 1025; Si lenses 1030; retainer 1035; and CCA board 1040. LWIR embodiment attributes comprise a 40 degree FOV, advantageous close quarters combat, mounting on the top of an Enhanced Combat Optical Sight (ECOS) to clear rifle iron sights, and a small 12 mm lens. In embodiments, the lens assembly is surface mounted onto the CCA.

Figure 11:
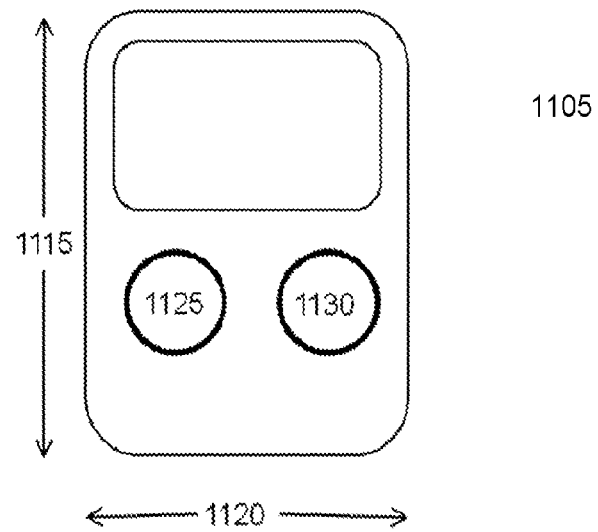
FIG. 11 depicts LWIR camera location and operator view diagrams configured in accordance with an embodiment.
Figure 11:
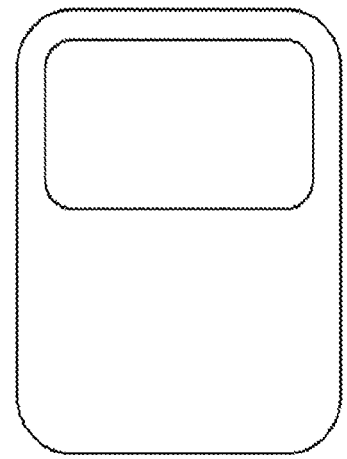

FIG. 11 depicts LWIR camera location and operator view diagrams 1100. Shown are LWIR camera location 1105 and operator view 1110. LWIR camera 1125 is shown beside day camera 1130. ACOG in its natural aiming provides digital alignment of the aim point, inserts the day camera image, uses eZoom for 3 levels of true zoom, has an optical shutter that cuts the view of the direct optic so that only the camera image is seen. It has the same form factor as a typical day Holographic Weapon Sight (HWS). Embodiment dimensions are about 2.5 inches 1115 and about 1.8 inches 1120.

FIG. 12 is a table of 640 pixel LWIR resolution and F# considerations 1200. Included data points are weapon recognition resolution 1205; the thickness of a goal post at 100 m (one pixel) 1210; and the thickness of a weapon at 50 m (one pixel) 1215. Spatial resolution in cm at range 1220 is shown for ranges 1225 for IFOV in mrads 1230 by FOV 1235. Focal length Fl in mm 1240 and F# 1245 are shown for FOV 1250 for a 12 mm lens 1255.

Table 1 depicts Electro-Optical Shutter Specifications

TABLE 1 depicts Electro-Optical Shutter Specifications.

| | FOS | FOS-AR |
|---|---|---|
| Open state transmittance[5] | ≥39.5% | ≥38.5% |
| Open state color | u' = 0.211 ± 0.01 | u' = 0.211 ± 0.01 |
| | v' = 0.494 ± 0.01 | v' = 0.494 ± 0.01 |
| Contrast | ≥1,000:1 @ $V_D$ = 4 V | ≥1,000:1 @ $V_D$ = 4 V |
| | ≥1,800:1 @ $V_D$ = 24 V | ≥1,800:1 @ $V_D$ = 24 V |
| Angular dependence | Contrast @ $V_D$ = 24 V ≥ 100:1 | Contrast @ $V_D$ = 24 V ≥ 100:1 |
| | −16° ≤ θ ≤ +16° horizontal, | −16° ≤ θ ≤ +16° horizontal, |
| | −20° ≤ θ ≤ +13° vertical | −20° ≤ θ ≤ +13° vertical |
| $T_{50}$ voltage | 1.54 V ± 0.2 V | 1.54 V ± 0.2 V |
| Closing time ($T_{100}$-$T_{10}$) | ≤6 ms @ $V_D$ = 4 V | ≤6 ms @ $V_D$ = 4 V |
| | ≤150 μs @ $V_D$ = 24 V | ≤150 μs @ $V_D$ = 24 V |
| Opening time ($T_0$-$T_{90}$) | ≤30 ms @ $V_D$ = 4 V | ≤30 ms @ $V_D$ = 4 V |
| | ≤35 ms @ $V_D$ = 24 V | ≤35 ms @ $V_D$ = 24 V |
| Reflectance per surface | ≤2% | ≤0.5% |
| Surface quality | N/A | 60/40 scratch/dig |
| Beam deviation | N/A | ≤1 arc min |
| RMS average power consumption[6] | ≤8 mW | ≤8 mW |
| Peak current[6] | ≥20 mA | ≥20 mA| |

Table 2 depicts Math for Windage Adjustors.

TABLE 2 depicts Math for Windage Adjustors.

| display FOV | 15 | degrees | +/−range | 11.6 | 1/1000 inch |
|---|---|---|---|---|---|
| display size | 1280 | pixels | ball diameter | 0.25 | |
| display IFOV | 0.204 | mrads | ball radius | 0.125 | |
| 1 MOA | 0.29 | mrads | level length | 1 | |
| 0.5 MOA | 0.145 | mrads | level advantage | 8.0 | |
| pixel size | 9.6 | um | max rotation | 0.092843 | rads |
| total range | 11.6 | mrads | max rotation | 92.84267 | mrads |
| Display total FOV | 56.9 | Pixels | max rotation | 5.335785 | degrees |
| total range dim | 546.13 | um | screw range +/− | 92.84267 | 1/1000 inch |
| total range dim | 0.5461 | mm | | | |
| total range dim | 23.21 | thousands of inch | | | |

Table 3 depicts Oplic Specifications

TABLE 3 depicts Optic Specifications.

| Primary Magnification PMAG | 0.130-0.076X |
|---|---|
| Focal Length FL (mm) | 17.5 |
| Maximum Sensor Size (mm) | ½" |
| Working Distance (mm) | 150-400 |
| Aperture (f/#) | 2.5 |
| Field of View, ½" Sensor (mm) | 51-87 |
| Resolution, 150 mm Working Distance | @ 35% Contrast: 194 lp/mm On-Axis, 163 lp/mm 0.7 Field, 151 lp/mm Full Field |
| Distortion, 150 mm Working Distance (%) | 0.7 Diagonal, 0.51 Horizontal |
| Resolution, 250 mm Working Distance | @ 35% Contrast: 200 lp/mm On-Axis, 175 lp/mm 0.7 Field, 146 lp/mm Full Field |
| Distortion, 250 mm Working Distance (%) | 0.9 Diagonal, 0.60 Horizontal |
| Outer Diameter (mm) | 14.0 |
| Length (mm) | 20.7 |
| Mount | S-Mount |
| Mounting Threads | M12 × 0.5 mm |
| RoHS | Exempt |

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A holographic, single-unit, augmented sight device comprising:
   a single housing containing
   a holographic eyepiece;
   at least two internal digital cameras in said housing;
   a display to display an image from either of said two internal digital cameras;

a shutter switching to said display;
a red dot fiber-coupled LED reticle assembly;
a lower coupling prism presenting a reticle of said reticle assembly;
wherein said at least two internal digital cameras include a visible wavelength digital color camera and a Long Wave Infrared (LWIR) digital camera;
wherein said red dot fiber-coupled LED reticle assembly comprises:
a spherical ball configuration;
said spherical ball configuration sandwiched between two matching seats, said seats compressed together to contain said ball configuration optical position; and
a lever attached to said spherical ball configuration, said lever configured to rotate said spherical ball by moving said lever up/down and left/right thereby providing a slight translation necessary to adjust windage and elevation, whereby only minor translation is needed for red dot adjustment.

2. The device of claim 1, wherein said display is an OLED/LCD display.

3. The device of claim 1, wherein said shutter is an electro-optical shutter.

4. The device of claim 1, wherein said red dot fiber-coupled LED reticle assembly comprises:
two compression plates;
a collimator;
optics; and
two drive screws for lever adjustment;
whereby two sliding translation stages move said collimator position up/down or left/right, and a part count is significantly reduced, reducing cost and increasing reliability of aim point position.

5. The device of claim 1, further comprising molded glass optics.

6. The device of claim 1, wherein said device includes only one prism.

7. The device of claim 6, wherein said device is a Realtime Aiming Zeroing Reconnaissance system.

8. The device of claim 1, wherein said device is a pocket scope/viewer.

9. The device of claim 1, further comprising a zoom capability.

10. The device of claim 1, further comprising a red dot aim point generated by the red dot fiber-coupled LED reticle assembly for the at least two internal digital cameras.

11. A method for using a holographic, single-unit, augmented sight device comprising:
providing a single housing containing a holographic eyepiece; at least two internal digital cameras; a display to display an image from either of said two internal digital cameras; a shutter presenting said display; a red dot fiber-coupled LED reticle assembly; and a lower coupling prism presenting reticle of said reticle assembly; and
aiming, through said holographic, single-unit, augmented sight at a target in at least one of visible and Long Wave Infrared (LWIR) wavelengths;
wherein said at least two internal digital cameras comprise a visible wavelength digital color camera and a LWIR digital camera; and
wherein windage and elevation adjustment is accomplished by rotating a spherical ball of said red dot fiber-coupled LED reticle assembly by moving a lever up/down, left/right, whereby only minor translation is needed for red dot adjustment.

12. The method of claim 11, wherein said at least two internal digital cameras each comprise:
about a 40 degree field of view at about a 1 power zoom;
about a 20 degree field of view at about a 2 power zoom;
about a 10 degree field of view at about a 4 power zoom; and
about a 5 degree field of view at about an 8 power zoom, wherein said about 5 degree, about 8 power zoom is full native resolution.

13. The method of claim 11, wherein said aiming includes both color visible and LWIR wavelengths.

14. The method of claim 11, wherein a cover is flipped down to sight optics that serves to turn on a visible camera subsystem and block light coming into said sight, allowing clear viewing of said display which provides a magnified scene to a user.

15. A holographic, single-unit, augmented sight system comprising:
a single housing containing
a holographic eyepiece;
a visible wavelength digital camera;
an Long Wave Infrared (LWIR) wavelength digital camera;
a display to display an image from said cameras;
an LCD shutter presenting said display;
a red dot fiber-coupled LED reticle assembly comprising a spherical ball configuration;
said spherical ball configuration sandwiched between two matching compression plate seats, said seats compressed together to contain said ball configuration optical position; a collimator; optics; and two drive screws; a lever attached to said spherical ball configuration, said lever providing a means to rotate said ball by moving said lever up/down, left/right thereby providing a slight translation necessary to adjust windage and elevation, whereby only minor translation is needed for red dot adjustment and a part count is significantly reduced, reducing cost and increasing reliability of aim point position; and
a lower coupling prism presenting reticle of said reticle assembly;
said sight providing about a 40 degree field of view at about a 1 power zoom; about a 20 degree field of view at about a 2 power zoom; about a 10 degree field of view at about a 4 power zoom; and about a 5 degree field of view at about an 8 power zoom.

* * * * *